United States Patent
Song et al.

(10) Patent No.: US 12,015,169 B2
(45) Date of Patent: Jun. 18, 2024

(54) METHOD OF MANUFACTURING SEPARATOR

(71) Applicant: UNICOH SPECIALTY CHEMICALS CO., LTD., Pohang-si (KR)

(72) Inventors: Bang Cha Rang Song, Pohang-si (KR); Lyong Jin Lee, Seoul (KR); Yoo Chul Kim, Busan (KR)

(73) Assignee: UNICOH SPECIALTY CHEMICALS CO., LTD., Pohang-si (KR)

( * ) Notice: Subject to any disclaimer, the term of this patent is extended or adjusted under 35 U.S.C. 154(b) by 39 days.

(21) Appl. No.: 17/370,160

(22) Filed: Jul. 8, 2021

(65) Prior Publication Data
US 2022/0384907 A1     Dec. 1, 2022

(30) Foreign Application Priority Data
May 25, 2021   (KR) ........................ 10-2021-0067215

(51) Int. Cl.
| | |
|---|---|
| *H01M 50/406* | (2021.01) |
| *H01M 50/431* | (2021.01) |
| *H01M 50/443* | (2021.01) |
| *H01M 50/497* | (2021.01) |

(52) U.S. Cl.
CPC ....... *H01M 50/406* (2021.01); *H01M 50/431* (2021.01); *H01M 50/443* (2021.01); *H01M 50/497* (2021.01)

(58) Field of Classification Search
CPC ............. H01M 50/406; H01M 50/409; H01M 50/411; H01M 50/414–429; H01M 50/443; H01M 50/446; H01G 11/50; H01G 11/84
See application file for complete search history.

(56) References Cited

U.S. PATENT DOCUMENTS

| | | | | |
|---|---|---|---|---|
| 6,794,078 B1 * | 9/2004 | Tashiro | ............... | H01M 8/0226 524/495 |
| 2002/0149004 A1 * | 10/2002 | Hayward | ................. | C08K 3/04 252/500 |

FOREIGN PATENT DOCUMENTS

JP        2007103090 A   *   4/2007

* cited by examiner

*Primary Examiner* — Stephan J Essex
(74) *Attorney, Agent, or Firm* — LEX IP MEISTER, PLLC

(57) ABSTRACT

In one embodiment of the present invention, it is provided a method of manufacturing a separator comprising: preparing expansion graphite; pulverizing the expansion graphite; mixing the expansion graphite and polymer; and forming a separator by molding the mixture.

7 Claims, 1 Drawing Sheet

Expanded graphite
(Tap density: 0.016 g/ml)

Crushed graphite
(Tap density: 0.017 g/ml)

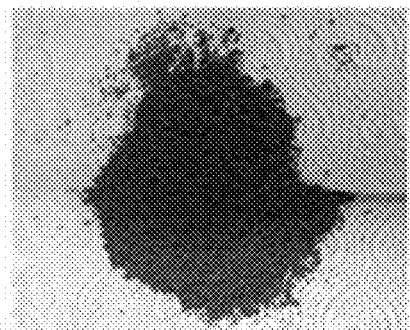
Expanded graphite
(Tap density: 0.016 g/ml)
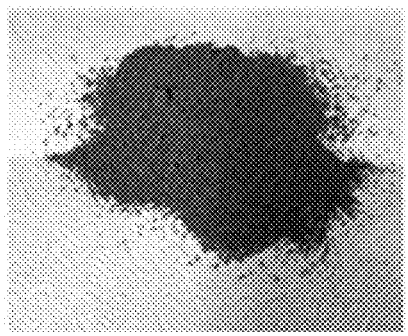
Crushed graphite
(Tap density: 0.017 g/ml)

METHOD OF MANUFACTURING SEPARATOR

CROSS-REFERENCE TO RELATED APPLICATION

This application claims priority to and the benefit of Korean Patent Application No. 10-2021-0067215 filed in the Korean Intellectual Property Office on May 25, 2021, the entire contents of which are incorporated herein by reference.

BACKGROUND OF THE INVENTION

(a) Field of the Invention

It is about the manufacturing method of the separator.

(b) Description of the Related Art

Expansion graphite material flexible separator can be used in flow batteries containing sulfuric acid or vanadium electrolyte. At this time, swelling occurs whenever charge or discharge is repeated. This increases the permeability of vanadium ions. In addition, the electrical resistance of the separator increases, resulting in performance deterioration such as a decrease in the efficiency of the flow cell. The following process can be used to manufacture a separator capable of suppressing swelling. First, a preform having an appropriate thickness can be prepared by spraying, mixing, drying and heat treatment of an aqueous PTFE emulsion solution. Thereafter, a separator may be manufactured through a final rolling or pressing process. For example, when manufacturing 100 g of expansion graphite containing 6 wt % PTFE, 94 g of expansion graphite and 600 g of 1 wt % PTFE aqueous solution are required, and 594 g of water is stored inside the expansion graphite. Since the density of expansion graphite is quite low, uniform mixing of PTFE binder is required to suppress swelling. To achieve this, a technique of coating the expansion graphite surface by spraying a PTFE aqueous solution having a low concentration while stirring can be used. However, at this time, since the mixture of PTFE binder and expansion graphite contains a considerable amount of water, energy consumption during drying is large. In addition, due to the use of water, the maintenance cost such as corrode of equipment increases, which may cause problems such as increase in manufacturing cost and process complexity. In addition, in the case of expansion graphite, the density of expansion graphite powder is small and the particle size is large, so when a small amount of binder is used, there is a drawback that is difficult to dry mixing. In addition, in the case of a separator manufactured through an existing process, there is a problem that the chemical stability is deteriorated due to the sulfur (S) component that must be included.

SUMMARY OF THE INVENTION

We want to increase the density of the graphite separator by increasing the density of expansion graphite, which has a lower density than general graphite. More specifically, we want to increase the density of the graphite separator by adding a new process to increase the density by pulverizing expansion graphite. Also, we want to improve the part where chemical stability is poor due to sulfur contained in expansion graphite. In one embodiment of the present invention, it is provided a method of manufacturing a separator comprising:

preparing expansion graphite; pulverizing the expansion graphite; mixing the expansion graphite and polymer; and forming a separator by molding the mixture.

The step of pulverizing the expansion graphite is performed that the expansion graphite is pulverized to a particle size of 60 to 300 μm (based on D50).

The separator has a tap density in the range of 0.008 to 0.03 g/ml. After a step of pulverizing the expansion graphite and before a step of mixing the pulverized expansion graphite and polymer, the method further comprises the step of high temperature heat treatment of the pulverized expansion graphite.

The high temperature heat treatment step is carried out at 500 to 1,000° C. The S content of the separator is 2 wt % or less.

The conductivity of the separator is in the range of 800 to 1500 S/cm.

After mixing the pulverized expansion graphite and polymer, the method further comprises a step of low temperature heat treatment of the mixture.

The temperature of the low temperature heat treatment step is in the range of 50 to 250° C.

It is intended to provide a separator with improved mechanical/physical properties. Also, it is intended to provide a separator with improved chemical stability at the same time.

BRIEF DESCRIPTION OF THE DRAWINGS

FIG. 1 is a photograph before/after pulverized expansion graphite.

DETAILED DESCRIPTION OF THE EMBODIMENTS

Hereinafter, an embodiment of the present invention will be described in detail. However, this is provided as an example, and the present invention is not limited thereto, and the present invention is only defined by the scope of claims to be described later.

In one embodiment of the present invention, it is provided a method of manufacturing a separator comprising:

preparing expansion graphite; pulverizing the expansion graphite; mixing the expansion graphite and polymer; and forming a separator by molding the mixture.

The separator plate of the present invention may be a separator plate for a redox flow battery.

The flow battery according to the present application may mean a secondary battery capable of storing electricity, also referred to as a redox flow secondary battery (or a flow battery).

A typical lithium ion battery generates electrical energy through the movement of lithium ions from anode to cathode or from cathode to anode, whereas in the flow battery, electrons or protons ($H_+$) move through electrolyte between anode and cathode.

For example, in the case of a vanadium flow battery containing an electrolyte in which vanadium ions are dissolved, $VO^{2+}$ ions lose electrons at the cathode to form $VO^{2+}$ ions. The $VO^{2+}$ ion is generated, and the generated $H^+$ moves to the anode to reduce $V^{3+}$. It can then be charged by creating $V^{2+}$ ions.

The process of discharging the vanadium flow battery may conversely include a process in which $V^{3+}$ ions are generated at the anode and $VO^{2+}$ ions are generated at the cathode.

Expandable graphite according to the present application means a graphite compound that can be expanded or exfoliated by heat. The expansion graphite can have a porous structure, so it can be used as a separator in conventional flow batteries, but there is a drawback in that swelling occurs inside the electrolyte.

According to one embodiment of the present application, the polymer may include a polymer selected from the group consisting of PVDF (polyvinylidene fluoride), PTFE (polytetrafluoroethylene), PP (polypropylene), PE (polyethylene), PVC (polyvinylchloride), and combination thereof. However, the present invention is not limited thereto.

According to one embodiment of the present application, the polymer may include, but is not limited to, a hydrophobic polymer. The polymer can be filled into the pores of the expansion graphite.

In this regard, if the polymer is chemically stable, it may be difficult to penetrate the electrolyte into the inside of the separator because damage such as dissolution or reduction of the polymer by the electrolyte does not occur.

When the polymer is hydrophobic, penetration of the electrolyte into the polymer or the inside of the separator can be further suppressed, so the separator can have high swelling suppression performance.

The expansion graphite is hydrophobic by default, but the hydrophobic can be enhanced by the polymer.

According to one embodiment of the present application, based on 100 parts by weight of the separator, the polymer may be included as 5 parts by weight to 20 parts by weight, but is not limited thereto. For example, based on 100 parts by weight of the separator, the polymer may contain from about 5 parts by weight to about 20 parts by weight, from about 8 parts by weight to about 20 parts by weight, from about 11 parts by weight to about 20 parts by weight, from about 14 parts by weight to about 20 parts by weight, from about 17 parts by weight to about 20 parts by weight, from about 5 parts by weight to about 8 parts by weight, from about 5 parts by weight to about 11 parts by weight, from about 5 parts by weight to about 14 parts by weight, from about 5 parts by weight to about 17 parts by weight, from about 8 parts by weight to about 17 parts by weight, or from about 11 parts by weight to about 24 parts by weight, but is not limited thereto.

Preferably, based on 100 parts by weight of the separator, the polymer can be included as 10 parts by weight to 20 parts by weight.

Based on 100 parts by weight of the separator, if the polymer contains less than 5 parts by weight, the separator can be rapidly expanded by the ion of the electrolyte, so it may be difficult to use for more than 10 years.

When the polymer is contained in excess of 20 parts by weight based on 100 parts by weight of the separator, the degree of swelling of the separator may be further reduced, but the electrical resistance increases and the performance of the flow battery using the separator will be deteriorated.

As will be described later, as the hydrophobic polymer is filled in the pores of the powder of the expansion graphite, swelling may not occur even if the expansion graphite reacts with the electrolyte, or the degree of swelling may be low.

The step of pulverizing the expansion graphite; may be a step of pulverizing the expansion graphite to a particle size of 60 to 300 μm (based on D50).

At this time, if this range is satisfied, there is an effect of increasing the dispersion/mixing and homogenization of the polymer during molding; and increasing the strength.

The manufactured separator may have a tap density in the range of 0.008 to 0.03 g/ml. If this range is satisfied, it has the effect of increasing the separator density during molding to lower the separator electrolyte permeability and increasing the separator corrosion resistance.

After a step of pulverizing the expansion graphite and before a step of mixing the pulverized expansion graphite and polymer, the method further comprises the step of high temperature heat treatment of the pulverized expansion graphite.

It is possible to control the sulfur (S) component through this high temperature heat treatment step.

More specifically, the high temperature heat treatment step may be performed at 500 to 1,000° C.

The S content of the prepared separator may be 2 wt % or less. When the sulfur content is controlled in this way, it has the effect of improving chemical stability and reducing electrical resistance by increasing the purity of carbon.

The conductivity of the prepared separator may be in the range of 800 S/cm to 1500 S/cm.

In this case, when the flow battery is manufactured using the prepared separator, the efficiency of the unit flow battery and the output and efficiency of the stack battery are increased.

According to one embodiment of the present application, the step of mixing the expansion graphite and the polymer may be performed by a method selected from the group consisting of:

dry mixing, wet mixing, spin coating, bar coating, nozzle printing, spray coating, slot die coating, gravure printing, inkjet printing, screen printing, electrohydrodynamic jet printing, electrospray, and combination thereof, but it is not limited thereto.

Preferably, the expansion graphite and the polymer can be dry mixed.

After mixing the pulverized expansion graphite and polymer, the method further comprises a step of low temperature heat treatment of the mixture.

The temperature of the low temperature heat treatment step is in the range of 50 to 250° C. The reason for performing this low temperature heat treatment step is to soften or melt the polymer used as an additive to increase the binding or impregnation effect and improve strength.

According to one embodiment of the present application, the step of forming the separator may be performed by a process selected from the group consisting of:

hot rolling, cold rolling, press, forging (hammering), drawing, extrusion, bending pipe, and combination thereof, but it is not limited thereto.

According to one embodiment of the present application, the step of forming the separator may further include forming the mixture into a preform and molding the preform into the separator, but is not limited thereto.

The following examples illustrate the present invention in more detail. However, the following exemplary embodiment is only an exemplary embodiment of the present invention, and the present invention is not limited to the following exemplary embodiment.

Exemplary Embodiment

Natural graphite was chemically and thermally expanded to prepare natural graphite flakes having a volume of about 80 to 180 times greater than that of conventional natural graphite.

At this time, heat treatment was performed at 700° C. or higher and less than 950° C. More specifically, the graphite was heat treated at 920° C. through the expansion furnace to expand the graphite and simultaneously remove impurities such as oxygen functional groups and sulfur.

The grinding process was performed to increase the density of the final prototype, the separator, by increasing the density of the expansion graphite having a low density.

The output value of the pulverizer and the residence time of the expansion graphite in the pulverizer were increased, and it was confirmed that the density of expansion graphite increased to 0.028 g/ml after pulverization.

Thereafter, additional heat treatment was performed at 650° C. to remove the remaining impurities and sulfur. Through the heat treatment process, it was confirmed that the sulfur content decreased from 1.20 wt % to 0.84 wt %, and the carbon purity increased by about 1% from 96.53% to 97.58%.

TABLE 1

| Reaction condition | Contents of Carbons | Contents of Sulfur | Remark |
|---|---|---|---|
| 650° C for 10 s | 96.53% | 1.20% | Non-detection of nitrogen and hydrogen |
| 650° C for 20 s | 95.22% | 1.30% | Non-detection of nitrogen and hydrogen |
| 650° C for 30 s | 97.48% | 0.96% | Non-detection of nitrogen and hydrogen |
| 650° C for 40 s | 97.58% | 0.84% | Non-detection of nitrogen and hydrogen |

* Evaluation result of carbon and sulfur content by heat treatment time

Then, expansion graphite and PVDF were added to the Loedige mixer at a constant ratio of 8.5:1.5 and mixed. By adjusting the roll interval during the loading process, conditions that can satisfy the target density of 1.6 g/ml of the separator plate prototype were established.

In the case of the rolling process, the equipment was replaced to enable hot rolling by adding a heating roll to the existing cold rolling process.

As the heat treatment temperature was increased, it was confirmed that the formability of the separator prototype increased, particularly, it was confirmed that the optimum formability was shown at 195° C. Therefore, the heat treatment temperature condition through the heating roll was established at 195° C.

Evaluation of Penetration Resistance of Separator

To measure the penetration resistance of the separator (thickness 0.55 mm, density 1.65 g/cc) manufactured by UNICOH CHEMICAL, it was cut into 5 cm*5 cm size and measured by the penetration resistance measurement method.

The pressure was 10 MPa. The penetrating electrical resistance was self-rated as 4.25 mΩ-cm².

TABLE 2

| Items | Prototype of separator |
|---|---|
| 4-layer stacked resistance (mΩ) | 0.83 |
| 2-layer stacked resistance (mΩ) | 0.49 |
| R (mΩ-cm²) | 4.25 |
| Average separator thickness (mm) | 0.586 |
| Penetrating electrical conductivity (mΩ-cm) | 72.53 |

* Evaluation of penetration resistance of separator

Small Flow Battery Characteristic Evaluation

The cell was assembled using a small test cell (10 cm²) using a separator (thickness 0.55 mm, density. 1.65 g/cc) manufactured by UNICOH CHEMICAL, and efficiency was evaluated by an authorized evaluation agency.

The evaluation result of the authorized evaluation agency achieved 97.6% of electrical efficiency and 86.3% of energy efficiency.

50 W Class Flow Battery Performance Evaluation

A 50 W stack was manufactured using a separator (thickness 0.55 mm, density 1.65 g/cc) manufactured by UNICOH CHEMICAL, and the performance was evaluated using an electrolyte solution (1.7M V 4.5 S, 1 L).

The electrolyte was 1.7 M V 4.5 M S 1 L (positive electrode)/1 L (negative electrode), and the flow rate was fixed at 228 mL/min, and evaluation was performed under room temperature conditions.

The efficiency of the stack was calculated by charging and discharging energy ratio by charging up to 1.7V per cell at 0.08 A/cm² and discharging up to 0.8V per cell at the same current.

In addition, efficiency of 84.05% was achieved with the second and third cycle averages.

TABLE 3

| Cycle No | Amount of electricity (Ah) | | Energy (Wh) | | Efficiency (%) | | |
|---|---|---|---|---|---|---|---|
| | Charging | discharge | Charging | discharge | E | E | E |
| 2 | 7.58 | 7.402 | 57.421 | 48.41 | 7.65 | 6.33 | 4.31 |
| 3 | 7.588 | 7.349 | 57.315 | 48.017 | 6.85 | 6.50 | 3.78 |

* 50 W charge and discharge efficiency

The present invention is not limited to the exemplary embodiments and can be manufactured in various different forms, and a person of an ordinary skill in the technical field to which the present invention belongs is without changing the technical idea or essential features of the present invention. It will be understood that the invention may be embodied in other specific forms. Therefore, it should be understood that the exemplary embodiments described above are exemplary in all respects and not restrictive.

What is claimed is:

1. A method of manufacturing a separator comprising:
    preparing expansion graphite;
    pulverizing the expansion graphite;
    mixing the expansion graphite and polymer; and
    forming a separator by molding the mixture,
    wherein after the step of pulverizing the expansion graphite but before the step of mixing the pulverized expansion graphite and polymer, a step of high temperature heat treatment of the pulverized expansion graphite is performed, and
    wherein the S content of the heat treated pulverized expansion graphite is 0.84 wt % to 1.30 wt %.

2. The method of claim 1, wherein the step of pulverizing the expansion graphite is performed that the expansion graphite is pulverized to a particle size of 60 to 300 μm (based on D50).

3. The method of claim 1, wherein the pulverized expansion graphite has a tap density in the range of 0.008 to 0.03 g/ml.

4. The method of claim 1, wherein the high temperature heat treatment step is carried out at 500 to 1,000° C.

5. The method of claim 1, wherein the conductivity of the separator is in the range of 800 to 1500 S/cm.

6. The method of claim 1, wherein after mixing the pulverized expansion graphite and polymer, the method further comprises a step of low temperature heat treatment of the mixture.

7. The method of claim 6, wherein the temperature of the low temperature heat treatment step is in the range of 50 to 250° C.

* * * * *